Dec. 9, 1947.　　　A. A. SCHLAAK　　　2,432,125
ROPE RELEASE
Filed Dec. 11, 1945

Inventor
ALBERT A. SCHLAAK

By Clarence A. O'Brien
and Harvey B. Jacobson
Attorneys

Patented Dec. 9, 1947

2,432,125

UNITED STATES PATENT OFFICE 2,432,125

ROPE RELEASE

Albert A. Schlaak, Hazel Run, Minn.

Application December 11, 1945, Serial No. 634,374

1 Claim. (Cl. 280—150)

The invention as described herein, and illustrated in the accompanying drawings, consists of a rope release for tractors, an object of which is to provide means whereby a rope for controlling plow shares of a trailer plow may be automatically released when the plows contact an obstacle which may break the plow unless the trip rope is instantly released from the tractor connection.

Another object of the invention is to provide a spring controlled rope release.

Other features and advantages will become more readily apparent from the following description and the accompanying illustrative drawings in which.

Figure 1:
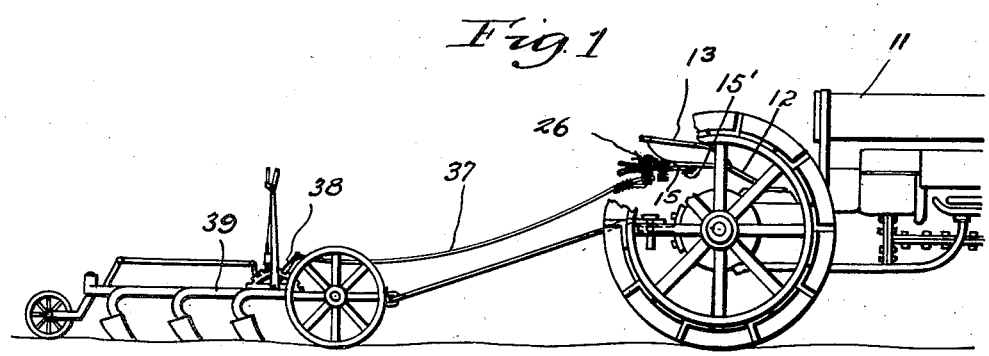
Figure 1 is a diagrammatic view illustrating the application of the invention.
Figure 2:
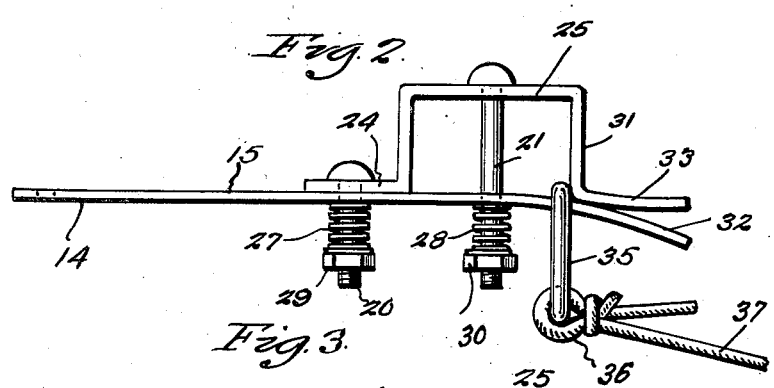
Figure 2 is an elevational view of the release.
Figure 3:
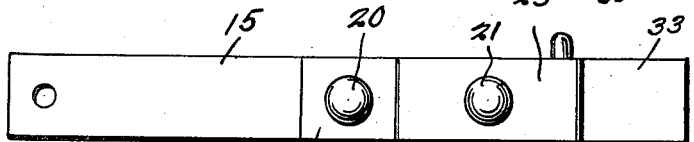
Figure 3 is a plan view thereof.
Figure 4:
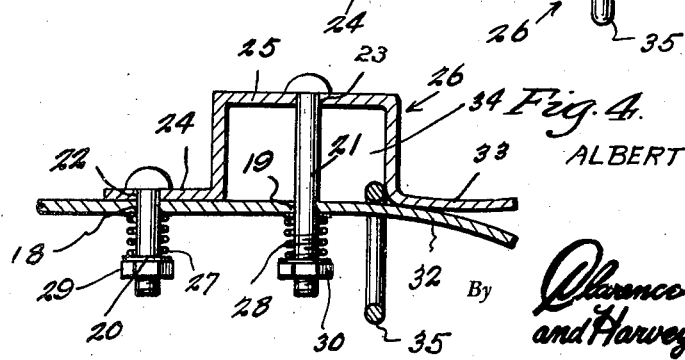
Figure 4 is a longitudinal sectional view of the device.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout. A tractor 11 will be provided with a support 12 at its rear end for supporting a driver's seat 13 which will be secured thereto in any desired manner. The front or inner end 14 of a metal strap 15 will be attached to the seat 13 by means of the bolt 15'. The opposite or outer free end of said strap is provided with bores 18 and 19, through which bolts 20 and 21, pass. Said bolts also projecting through bores 22 and 23, in the foot-piece 24, and head 25, of an inverted U-member 26. Coiled upon the depending ends of the bolts 20 and 21, are springs 27 and 28, the tension of which is adjustable by nuts 29 and 30, upon which the springs seat. The arm 31, of member 26, extends down to engage the outer terminal 32, of the strap 15, which terminal is curved downwardly and upon which seats the foot 33, of the U-member. Normally held within the space 34, under the U-member and upon the strap 15, is a ring 35, to which is attached the end 36, of the rope or cable 37, the other end of which is fixed to a control lever 38, upon the plow 39.

From the foregoing it will be seen that, if the plow is checked in its movement through contact with some obstacle, the ring 35, will be released from the spring control member 36, through the raising of the arm 31, by the said ring, thus avoiding probable damage to the plow.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention, that which is claimed to be new and desired to be procured by Letters Patent is:

A rope release for plows comprising a flat strap being apertured at its forward end to provide means for attaching the same to a tractor and formed with spaced apertures intermediate its ends, the rear end of said strap being curved downwardly to form an inclined jaw, and an inverted U-shaped member having oppositely extending terminal ends supported on said strap for slidable movement toward and away from the same in a vertical direction, the front end of said member and its central portion being apertured for aligning with the spaced apertures in said strap, bolts disposed through said aligned apertures, coil springs on the lower ends of said bolts below said strap, nuts on said bolts for selectively varying the tension between said strap and the U-shaped member, the rearwardly extending terminal end of said U-shaped member being curved upwardly to form a jaw for cooperating with said first-mentioned jaw, and a rope release ring supported on said strap at the forward end of the jaws when in closed position.

ALBERT A. SCHLAAK.

REFERENCES CITED

The following references are of record in the file of this patent:

UNITED STATES PATENTS

| Number | Name | Date |
|---|---|---|
| 1,682,994 | Simon | Sept. 4, 1928 |
| 2,370,232 | Creekbaum | Feb. 27, 1945 |